A. R. SANNA.
ICE CREAM MACHINERY.
APPLICATION FILED OCT. 3, 1919.
1,351,302.
Patented Aug. 31, 1920.
2 SHEETS—SHEET 1.
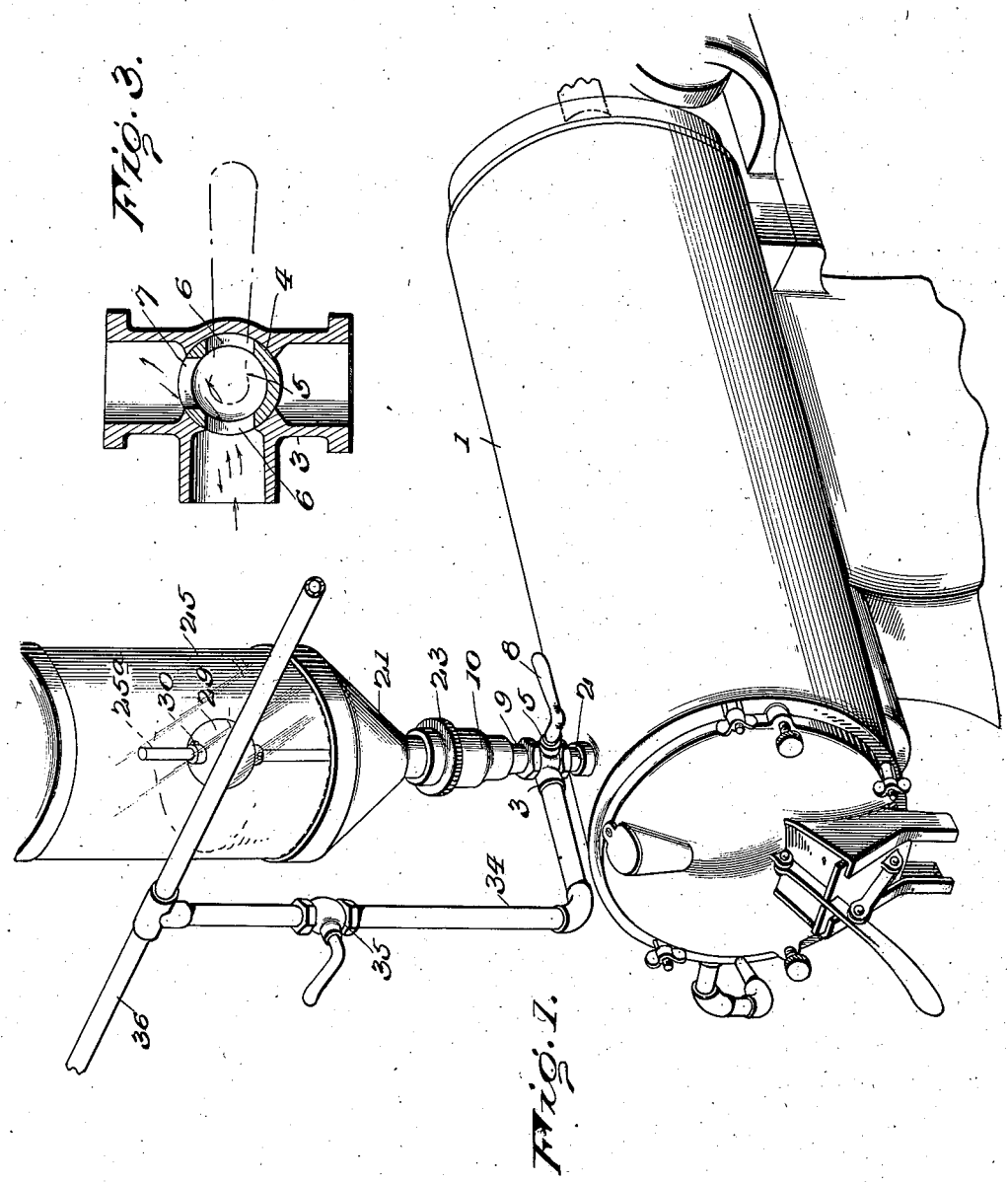
Inventor
Anthony R. Sanna
by
his Atty.

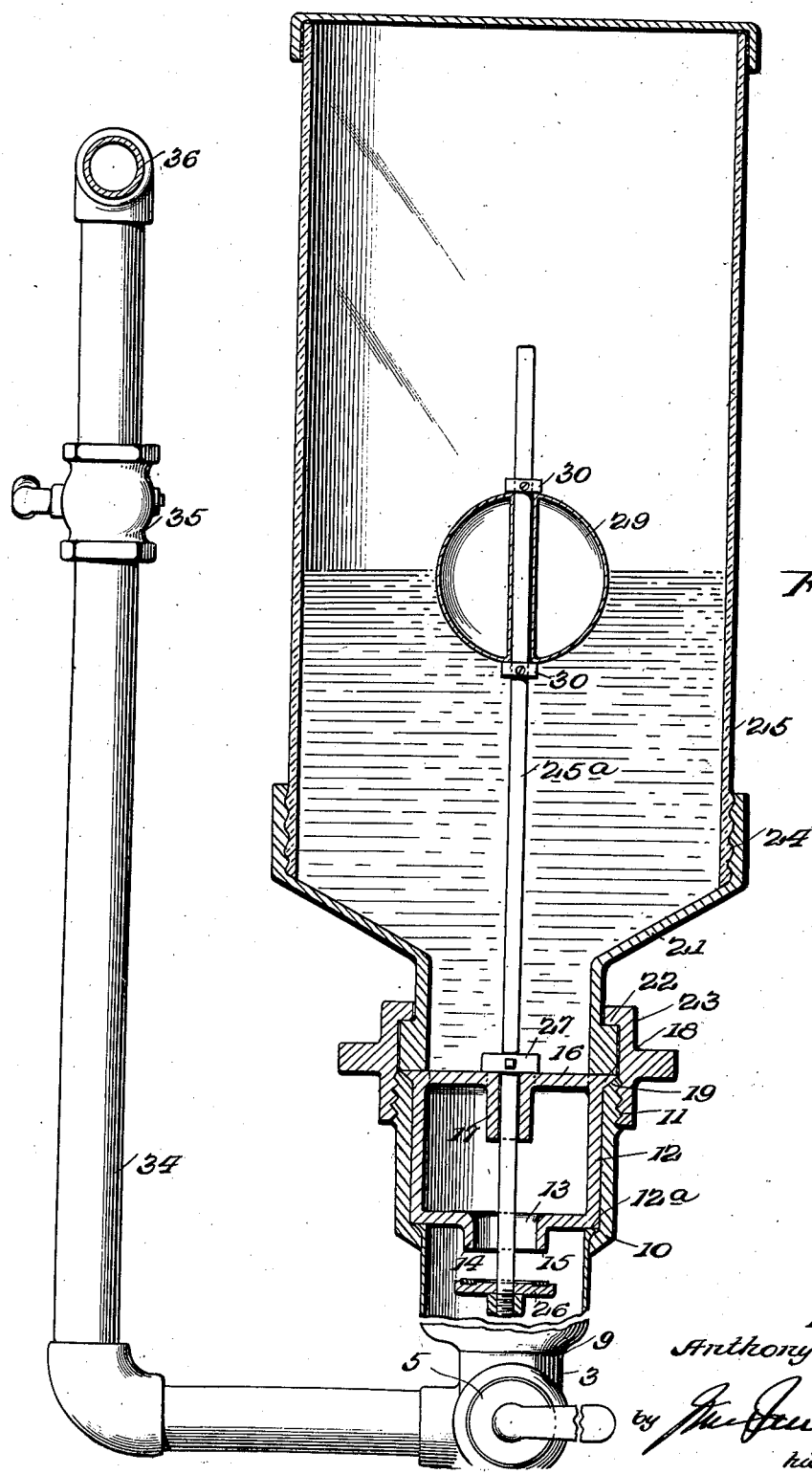

UNITED STATES PATENT OFFICE.

ANTHONY R. SANNA, OF WASHINGTON, DISTRICT OF COLUMBIA, ASSIGNOR TO GEORGE P. SACKS, OF BETHESDA, MARYLAND.

ICE-CREAM MACHINERY.

1,351,302.   Specification of Letters Patent.   Patented Aug. 31, 1920.

Application filed October 3, 1919. Serial No. 328,285.

*To all whom it may concern:*

Be it known that I, ANTHONY R. SANNA, citizen of the United States, residing at Washington, District of Columbia, have invented certain new and useful Improvements in Ice-Cream Machinery, of which the following is a specification.

This invention relates to improvements in ice cream machinery.

In the manufacture of ice cream in large quantities, it is customary to make up the "mix" in one department and by pipes, introduce an approximate amount of the "mix" to a battery of freezers in another department.

The "mix" is introduced to a hopper over each freezer, and so far as applicant is aware in the present methods, the amount of "mix" introduced to a given hopper is largely determined by guessing. This frequently results in the cream frozen in one freezer being inferior to that frozen in an adjacent freezer, while other cream in some of the freezers in the battery will be up to the standard in quality. For instance, assume there be a battery of freezers, each capable of freezing twelve gallons of cream, and the approximate "mix" necessary for each freezer is six gallons, it follows that if the proportion of mix be greater than six gallons, the product will be denser than the required standard, while if the proportion of mix be less than six gallons, the product will be below the standard, since it will be provided with more air than required. In either case the freezer will produce the requisite twelve gallons of cream, but in the one the excess "mix" produces a loss in manufacturing cost, while in the second illustration given, the product is inferior.

This condition is due to the fact that in the rush in manufacturing the cream, the operator cannot afford the time to attend to and examine the exact amount of "mix" passing into each hopper, and even if time permitted, the means now employed would not positively insure the exact amount of mix being introduced to each hopper.

One of the prime objects of this invention is to provide means for automatically, and positively insuring each freezer in a battery receiving the exact amount of "mix" so that the product from one freezer will be of exactly the same standard of quality as that produced in all the other freezers in the battery.

A further object of the invention is to provide regulating means, so arranged that an operator can pass along a battery of freezers and open the valves, one after the other to permit the "mix" to flow, and when the requisite supply is introduced, the flow will be automatically cut off. Then by subsequent manual operation of a valve, the "mix" is released and flows to the respective freezer or freezers.

A further object of the invention is to provide a "mix" regulator which can be readily dismantled and cleaned, and quickly assembled rendering the structure sanitary.

The invention also comprehends improvements in the details of construction and arrangement of parts which will be hereinafter described and particularly pointed out in the claims.

In the accompanying drawings:

Figure 1, is a perspective view of a freezer illustrating the application of my invention.

Fig. 2, is an enlarged vertical section of the "mix" regulator.

Fig. 3, is a detail section of a three way valve employed in the regulator.

The numeral 1 indicates an ice cream freezer of usual type and communicating with the top thereof is a short section of pipe 2, provided with a T coupling 3, in which is formed a valve seat 4. Operating in the valve seat is a hollow rotary three way valve 5, provided with two alined ports, 6—6, and a port 7 right angularly disposed, and a handle 8, extends from one end of the said valve.

Communicating with the upper end of the T coupling is pipe 9 enlarged at its upper end, and provided with a casing 10, which is threaded externally as at 11. Seated on a shoulder 12ª, formed between the casing 10, and the pipe 9, is a cage 12 formed in its bottom with a central opening 13, surrounded by a depending flange 14, the lower end of the latter forming a valve seat 15, and at the top of the cage is a spider 16, having a central guide 17.

The upper end of the cage is flanged, as at 18, to rest on a seat 19, formed on the upper edge of the casing 10. Fitting snugly on the top of the cage, is the flanged neck of a funnel shape casing 21, and engaging the flange is the flanged end 22, of a union 23. The union extends over the joint between the casings, and is internally threaded to engage the thread 11, to lock the parts together. The upper end of the funnel shaped casing 21, is internally threaded to engage threads 24, on a glass receptacle 25. This receptacle is provided at the top with a loose fitting cover to keep out foreign matter.

Extending through the guide 17 and the opening 13, and projecting into the receptacle is a valve rod 25$^a$. Secured to the lower end of the rod 25$^a$, is disk valve 26, designed to seat on the valve seat 15, as will presently appear. The rod is provided with an adjustable collar 27, to limit its downward movement, the collar resting on the top of the cage when the valve is in open position.

On the upper end of the valve rod 25$^a$, is a float 29 held in adjusted position by collars 30—30.

Communicating with the horizontal portion of the T coupling is a branch pipe 34, having a valve 35, and connected to a feed pipe 36. The feed pipe 36, extends to a mixing machine, (not shown) and supplies a battery of regulators and freezers, as previously mentioned.

In operation, the operator turns the handle 8, to place port 7, in registry with the pipe 9, and one of the ports 6, in registry with the pipe 34. The mixture flows through the opening 13, cage 12, and to the receptacle, and as the level rises in the latter, the float is elevated which raises the valve 26, and closes the opening 13. It follows that when the float rises to the desired level the exact predetermined amount of mix will flow into the receptacle, and the flow will be automatically cut off. The operator in the meantime may direct his attention to other regulators or freezers in the battery, and when he finds it convenient to release the charge of mix to any particular freezer, he partially rotates the three way valve to bring the two parts 6 in registry with the pipes 2 and 9 and closes the end of the branch pipe 34, and the weight of the mix and its flowing down into the freezer opens the valve 26.

In this way all the freezers will receive exactly the same amount of mix, thus making all the ice cream of the same quality and thereby saving the manufacturer loss in excess, "mix" and the consumer the loss in an inferior product.

It follows from the foregoing description that the regulator, as associated in the manufacture of ice cream, is a time saver, and positively insures of all the product produced in any battery of freezers being of exactly the same predetermined proportions.

The construction described is sanitary, as the parts are, so arranged that they can be readily dismantled.

By releasing the union, the receptacle can be removed, and then the valve rod, cage and valve can be removed and all the parts sterilized.

What I claim is:—

1. In combination, an ice cream freezer, a mixture supply pipe located to supply "mix" to the freezer by gravity, a regulator between the mixture supply pipe and the ice cream freezer including means for automatically receiving a predetermined charge of "mix" from the mixture supply pipe, and manual means for simultaneously cutting off the supply of mix in the mixture pipe and discharging the predetermined charge of "mix" in the regulator to the freezer.

2. In combination, an ice cream freezer, a mixture supply pipe, a regulator connected to the freezer and the mixture supply pipe including a float and a valve, and a three way valve adapted to communicate with the mixture supply pipe, freezer, and regulator, whereby the mixture supply pipe, can be placed in communication with the regulator and the freezer cut off, or the mixture supply pipe cut off and the regulator placed in communication with the freezer.

3. In combination, an ice cream freezer, a regulator communicating therewith including a receptacle, a float in the receptacle, a valve controlled by the float, means for supplying the receptacle with mixture, and a rotary valve to place the receptacle in communication with the freezer and cut off the mixture, or cut off the freezer and place the mixture means in communication with the receptacle.

4. In combination, a freezer, a mixture supply pipe, a regulator between the mixture supply pipe and the freezer including a casing, a detachable cage mounted in the casing having a valve seat at its lower end, a receptacle, means for attaching and detaching the receptacle to and from the casing, a float in the receptacle, a rod extending into the receptacle and through the cage, a valve on the lower end of the rod, and a three way valve between the mixture supply pipe and the freezer, whereby when the three way valve is in one position the mixture from the mixture supply pipe will flow into the receptacle and automatically close the valve at the lower end of the rod against the valve seat on the casing, or when said three way valve is in another position communication between the receptacle and the freezer will be established.

5. In combination, an ice cream freezer, a regulator communicating with the ice cream freezer, including a three way manually operated valve and a valve controlled by the mixture to admit a predetermined charge of the mix to the regulator, and a mixture supply pipe connecting with the three way valve and extending upwardly to supply the mix to the regulator by gravity, the three way valve when opened in one position opening communication between the mixture supply pipe and the regulator to admit a charge of mix to the latter, and when turned in another position, opening communication between the regulator and the ice cream freezer to permit of the charge of mix passing to the ice cream freezer.

In testimony whereof I affix my signature.

ANTHONY R. SANNA.